106. COMPOSITIONS, COATING OR PLASTIC.

Patented July 15, 1930

1,770,797

UNITED STATES PATENT OFFICE

GUSTAVE ADOLPH NEW, OF PORT CLINTON, OHIO, ASSIGNOR TO THE AMERICAN GYPSUM COMPANY, OF PORT CLINTON, OHIO, A CORPORATION OF OHIO

CELLULAR GYPSUM PRODUCT

No Drawing. Application filed December 27, 1927. Serial No. 242,960.

This invention relates to improvements in cellular gypsum products, and more particularly to a composition of matters for building purposes of which calcined gypsum is the base, and having a cellular texture calculated to promote lightness in weight and to improve the heat and sound insulating properties of the material when formed into boards or blocks, cast as an insulating filler or applied to wall surfaces as a covering having acoustic properties.

The object of the invention is to provide an improved composition for a cellular gypsum having the requisite qualities of lightness, hardness and uniformity of cellular texture by the utilization and addition to the basic calcined gypsum of relatively inexpensive ingredients, having the property of creating a uniform and stable cell structure within a comparatively short period of time.

The merit of a composition having the foregoing characteristics will be better appreciated from a brief discussion of what has been accomplished heretofore in the attempt to produce a satisfactory cellular mix. In general, the basis of cell production has been the generation or liberation of gases within the mass by the addition of certain chemical ingredients reacting in the presence of water, giving off a free gas calculated to spread throughout the mass and form a cellular texture when the same has set and hardened. The more common gas producing ingredients used have been an acid salt, such as aluminum sulphate, and a carbonate of the alkali group—sodium, magnesium or the like—the resulting gas being carbon dioxide ($CO_2$). As a chemical phenomenon, the generation of $CO_2$ by this reaction has long been known and used in other arts, as for instance, in the baking of bread, and hence the introduction of this gas into a mass of calcined gypsum presents no particular problem. However, the control of the gas after it has been liberated has been the source of considerable difficulty, and it is to the solution of this problem that considerable effort has been directed. It follows naturally that a gas liberated into a more or less plastic mass will seek to rise and escape, and therefore means must be employed for holding or entangling the gas bubbles within the mass. This result has been accomplished to some degree by adding so-called entangling agents, such as glue, gelatinous substances and one of the several commercial "retarders", so-called. But these expedients have only proved to be partially effective, since once having entrapped the gas, it is essential that it shall be distributed in bubbles or cells of uniform size and uniformly throughout the mass, since otherwise the cells would tend to be larger at the top than at the bottom with the result that the structure would be relatively weak and spongy at the top and quite dense at the bottom.

Another difficulty encountered has been the prolongation of the period required to complete the gas generation, with the result that the cells continue to form and the bulk of the material to increase for a considerable time after it has been poured and commenced to set. Hence it is difficult, if not impossible, to gauge the volume of the wet mixture that will occupy any given space, or the ultimate thickness of a layer of the material to be spread over a given area. In short, the real problem is to control the mix, and hence to produce a mixture which can be accurately controlled as to the uniformity of cell structure, and the stability of the mass when in its plastic or wet condition.

In previous applications filed by me, to wit: Serial No. 192,793, filed May 19, 1927; No. 197,517, filed June 8, 1927; No. 213,227, filed August 15, 1927; and No. 237,985, filed December 5, 1927, I have sought to overcome the technical difficulties hereinabove discussed and have disclosed as many different and practical methods of attaining this end, by the use of different ingredients and combinations of ingredients. The present disclosure is still a further improvement and development in the same direction and one in which I have sought to bring the factors of uniformity and stability of cell structure within still narrower limits of probable error, and at the same time to simplify the process of production and to improve the quality of the product in other respects. The extent to which this object has been attained will be seen from the following discussion:

As heretofore, the basic ingredient of the composition is commercial calcined gypsum, that is, raw gypsum rock partially calcined at a temperature of about 350° F., (CaSO₄.1/2H₂O). To a given volume or weight of the gypsum is added relatively small amounts of hydrogen peroxide (H₂O₂), a catalyzer such as blood flour, together with an accelerator such as anhydrate, a waste product in the manufacture of gypsum products or the waste gypsum products themselves, as for instance, finely ground plaster board, block or other previously manufactured product which is available as waste.

The hydrogen peroxide is the principal ingredient added to generate the gas upon which the cellular structure is dependent, its chemical properties being best known by the readiness with which it gives off oxygen, particularly in the presence of a catalyzer. The blood flour has been found to be a very satisfactory catalytic substance and its chief purpose is to react with the hydrogen peroxide to accelerate the liberation of the oxygen. And finally, the presence of the accelerator so-called, serves to accelerate the setting of the mix and thus facilitate the making, pouring or applying operations. The accelerator primarily influences the action of the mix as a whole, and therefore is not to be confused with that of the blood flour or other material used in the same capacity, which is that of a catalyzer.

Blood flour is preferably used because it is a relatively cheap by-product of the packing industry, being the dried residue of animal blood (ox, sheep or hogs). Blood flour is readily procurable on the market at a relatively low cost. Hydrogen peroxide (H₂O₂) is a well known oxidizing agent containing two atoms of oxygen, one of which is readily given up leaving water (H₂O). For the present purpose the cheaper grades of commercial hydrogen peroxide, such as is used in the tanning and textile industries for bleaching, are quite satisfactory.

The process of producing a cellular mix is generally that of adding predetermined quantities of blood flour, hydrogen peroxide and water to the calcined gypsum, mixing the same together to a plastic consistency and then using it promptly for the particular operation at hand. The chemical action that takes place as the result of bringing these substances into intimate contact is the liberation of the oxygen from the hydrogen peroxide, accelerated by the action of the blood flour. Free oxygen is liberated which disseminates throughout the mass in small bubbles or globules giving the product a fine and uniform cellular texture when it has set and hardened.

To illustrate the proportions in which these ingredients are mixed, the procedure in preparing a small batch in a laboratory will first be given. Taking 500 grams of dry calcined gypsum, about 2½ grams of blood flour are added and thoroughly mixed therewith. In another vessel is poured from 340 to 350 c. c. of water to which is added from 25 to 40 c. c. of a commercial (3%) solution of hydrogen peroxide. The water with its hydrogen peroxide solution added is then mixed with the gypsum and blood flour mixture in the usual manner. The activity of the hydrogen peroxide and blood flour coming in contact with each other is evidenced by the immediate swelling or increased bulk of the mass, which continues for a period of from ten (10) to fifteen (15) seconds, whereupon the action ceases and the wet cellular mass becomes stable. In this condition the mass is poured out into suitable molds and the setting process immediately starts, the time required being governed by the amount of accelerator previously added to the gypsum.

In the commercial production of the product, the same general procedure is followed, except on a larger scale and varied according to the manner in which it is to be used. Considering, therefore, one hundred (100) pounds of calcined gypsum as the unit of measure, the amount of blood flour added according to the previously stated figures, would not be over .5 or ½ pound,—a ratio of approximately 200 parts to 1 part. The proportion of hydrogen peroxide to the total amount of water added would likewise be very small, considering a 3% solution which is largely composed of water. Hence, if the amount of the solution added is not more than 10% of the total water added, the actual hydrogen peroxide present would be in the neighborhood of .3 of 1%,—practically no more than a trace.

In using the mix for the manufacture of wallboard, blocks and like building materials, the process of mixing would be carried on continuously as is the present practice. However, for the erection of walls, floors, roofs and the like, the mixing would take place "on the job" and therefore the dry gypsum with the blood flour added would be prepared and shipped in bags and the proper proportion of water with the solution of hydrogen peroxide added, would be mixed with the dry mix and poured immediately thereafter.

Among the advantages of this cellular mix is the fact that the physical change takes place within a very short space of time with the result that it is entirely stable before it is actually poured or applied. For this reason it can be readily used for wall plaster, pre-cast or poured insulation, and all manufactured gypsum products where both heat and sound insulation are desired.

A further advantage is the increased strength of the material due to the very small percentage of cell-producing substance present, less than ½ of 1%, as compared with from 5 to 10% in mixtures using aluminum sulphate and carbonates for the generation of the cell forming gas. In other words, the full strength of the gypsum is not depleted to make room for the cell producing ingredients. Again, there is no deteriorating effect produced by the adding of gas generating chemicals, retarders and the like, which serve to give a cellular texture if properly handled, but at the same time tend to promote efflorescence, retard the setting of the mix, and otherwise interfere with the production of an entirely satisfactory and practical material. And finally, a mix prepared in accordance with the foregoing disclosure, provides a light homogeneous material of a uniform and fine cellular texture, so fine in fact that it can be readily spread onto a wall with a trowel and thus used as a wall plaster with the addition of sand or fibrous materials.

In stating that specific ingredients are preferred as catalytic or accelerating agents, I include also other ingredients having the same physical or chemical properties, and therefore I do not wish to be limited in the scope of the invention except as set forth in the appended claims. Moreover, the exact proportions in which the several ingredients are mixed may be varied without departing from the spirit of the invention.

I claim as my invention:

1. A method of producing a cellular gypsum mix consisting of forming a dry mix of calcined gypsum and blood flour in the proportions of substantially two hundred (200) parts to one (1) part, and mixing the same with water containing substantially one (1) part of a three per cent (3%) solution of hydrogen peroxide.

2. A method of producing a cellular gypsum mix, consisting of adding to a predetermined quantity of calcined gypsum, a relatively small quantity of blood flour, adding to a predetermined quantity of water a relatively small amount of hydrogen peroxide solution, and mixing the solid and liquid materials together into a plastic mass.

3. A method of producing a cellular gypsum product consisting of adding a relatively small quantity of blood flour to a predetermined quantity of calcined gypsum and mixing therewith a quantity of a solution of hydrogen peroxide and water sufficient to form a plastic mass.

4. A method of producing a cellular product consisting of mixing a solution of hydrogen peroxide and water with a mixture of calcined gypsum and blood flour.

5. A method of producing a cellular gypsum product consisting of mixing a solution of hydrogen peroxide and water with a mixture of calcined gypsum, blood flour and an accelerator.

6. A method of producing a cellular gypsum mix consisting of forming a dry mix of calcined gypsum and blood flour and mixing the same with water containing less than one per cent (1%) of hydrogen peroxide.

7. A method of producing a cellular gypsum mix consisting of forming a dry mix of calcined gypsum, blood flour and an accelerator and mixing the same with water containing less than one per cent (1%) of hydrogen peroxide.

8. A method of producing a cellular gypsum mix consisting of forming a dry mix of calcined gypsum and relatively small amounts of blood flour and an accelerator and mixing the same with water containing a relatively small quantity of hydrogen peroxide.

Signed at Port Clinton this 17th day of December, 1927.

GUSTAVE ADOLPH NEW.